Patented Nov. 11, 1947

2,430,815

UNITED STATES PATENT OFFICE 2,430,815

INCREASING ADHESIVITY OF BITUMENS FOR MINERAL AGGREGATES

Arthur B. Hersberger, Drexel Hill, and Felix C. Gzemski, Philadelphia, Pa., assignors to The Atlantic Refining Company, Philadelphia, Pa., a corporation of Pennsylvania No Drawing. Application March 31, 1945, Serial No. 586,036

5 Claims. (Cl. 106—273)

This invention relates to a method of improving the adhesivity of bitumens to mineral aggregates, and relates more particularly to the preparation of improved road paving compositions.

The two methods generally used in the preparation of bituminous pavements are, one in which a layer of bituminous cutback or emulsion is spread on a road, a layer of mineral aggregate such as crushed stone, is spread upon it, and the mixture is compacted; and the other method is one in which mineral aggregate is first provided with a coating of bitumen by mixing the aggregate mechanically with a bitumen or bituminous cutback or emulsion until an adhesive coating of the bitumen is formed on each piece of the aggregate, the coated aggregate then being laid on the road and compacted. Where aggregate is used that has first been dried and hot bitumen or bituminous cutback applied to the aggregate, there is little difficulty experienced in securing a good bond between the bitumen and the aggregate, except with an acidic aggregate such as siliceous aggregates.

One of the objects of the present invention is to permit the coating of surfaces of damp or wet aggregates with a bituminous composition in such a manner that the coating obtained is satisfactory and produces a firmly bonded mass.

A further object of this invention is to prepare a paving mixture bonded with asphalt in which the asphalt coating, when applied to either dry or wet aggregate is not readily displaced or stripped when subjected to the action of water.

A still further object of this invention is to prepare a bitumen or bituminous mixture containing an anti-stripping or adhesive agent which is stable to heat over considerable periods, and which is particularly adapted for incorporation in bitumens, asphalts, and road oils which may be stored, transported, or applied at elevated temperatures.

The present invention relates to a method of improving the adhesivity of bitumen to not only alkaline stones, such as limestone, slag, and dolomite, but also to acidic or siliceous type of mineral aggregates. Not only dry, but also wet aggregates may be successfully coated by the method of the present invention, and the pavings thereby prepared will not disintegrate under the action of water. It will be understood that the invention is especially advantageous in its application to the coating of wet mineral aggregates with bitumen, bituminous cutbacks, and bituminous emulsions.

Since adhesiveness is a consequence of wetting power, it is important that the wetting power of the bituminous binders toward the mineral aggregate be as high as possible. In the presence of moisture or water, adhesiveness depends upon the respective wetting powers of water and the bituminous binder toward the mineral aggregate; if the wetting power of the water is higher than that of the binder, the former will displace the latter, and prevent the bituminous binder from adhering to the surface of the aggregate. It is, therefore, an object of this invention to improve the adhesivity of the bituminous material as hereinafter described.

In accordance with the present invention, it has been found that the wetting power of bitumens to all types of mineral aggregates is markedly improved by incorporating in the bitumen a relatively small quantity of a hydroxy aluminum sulfonate, and particularly a dihydroxy or a mixture of mono and dihydroxy aluminum salts of an oil-soluble sulfonic acid. These basic aluminum salts of oil-soluble sulfonic acids, when added to bitumens in amounts of from 0.1% to 10.0% by weight, were found to be highly satisfactory in increasing the wetting power or adhesivity of the bitumens for aggregates. While larger quantities, for example, more than 10% of the salts may be used, the improvement in adhesivity is not increased proportionately, and it appears to be uneconomical in most cases to use more than about 10% by weight of the salts. Generally from 0.5% to 5% will suffice, except under conditions in which the aggregate is exceptionally wet. The dihydroxy aluminum sulfonates, and mixtures of mono and dihydroxy aluminum sulfonates not only proved to be excellent anti-stripping agents but were stable to heat at temperatures up to 400° F. for extended periods, and to temperatures of 500° F. to 600° F. for somewhat shorter periods. On the other hand, the normal sulfonate, i. e., aluminum trisulfonate, while exhibiting anti-stripping properties at ordinary temperatures, was found to be unstable to heat and to rapidly lose its anti-stripping properties when exposed to elevated temperatures of the order of 400° F. or higher even for short periods.

The salts or sulfonates employed in accordance with this invention are prepared by reacting oil-soluble sulfonic acids with an aluminum compound, preferably hydrated alumina in an amount sufficient to produce the basic aluminum sulfonate. The oil-soluble sulfonic acids may be derived from petroleum oils, heavy coal tar distillates, fats, fatty oils, and the like by subjecting the raw material to treatment with a sulfonating agent such as concentrated sulfuric acid, fuming sulfuric acid, chlorsulfonic acid, or sulfur trioxide for a period of time sufficient to effect sulfonation, and thereafter separating insoluble sludge from the oil containing the sulfonic acids. The oil solution of sulfonic acids is then reacted with aluminum hydroxide to give dihydroxy or a mixture of mono and dihydroxy aluminum sulfonates.

A preferred method of preparing the basic aluminum sulfonates is as follows: A quantity of a water-soluble aluminum salt, such as AlCl₃ is dissolved in water and sufficient ammonium hydroxide is added to it until the resultant hydrated alumina slurry just turns pink to phenolphthalein indicator. This Al(OH)₃ slurry may be decanted or filtered from the reactant solution, and is preferably water washed until it is substantially free of soluble salts, e. g., NH₄Cl. The Al(OH)₃ in a freshly precipitated state is then admixed in proper quantity with an oil-soluble sulfonic acid or a solution of sulfonic acids in oil. In any case the reaction mixture is heated to a maximum temperature of 300° F. until all water is driven off and the reaction is completed to give a clear product. Air agitation of the mixture facilitates the removal of water. In the event that no preliminary washing of the Al(OH)₃ slurry for removal of soluble salts (NH₄Cl) was carried out, the NH₄Cl may be settled from the oil containing the basic aluminum sulfonates by maintaining the oil in a quiescent state at elevated temperature, or it may be filtered out according to conventional methods. Depending upon the ratio of Al(OH)₃ and sulfonic acids used, the heat stable sulfonates produced may be the dihydroxy sulfonate Al(OH)₂.(RSO₃), or a mixture of mono and dihydroxy sulfonates Al(OH).(RSO₃)₂ and Al(OH)₂.(RSO₃) in which the monohydroxy compound may comprise up to about 75% of the mixture.

If the basic sulfonates are prepared by reacting an oil containing oil-soluble sulfonic acids with Al(OH)₃ slurry or paste, the resulting oil solution of basic sulfonates may be added directly to the bitumen, asphalt, road oil, cutback, etc., or the oil solution may be distilled under reduced pressure to remove a portion of the oil and thus concentrate the sulfonates. On the other hand, the basic sulfonates may be extracted from the oil solution with a suitable solvent such as alcohol or alcohol-water mixtures and the sulfonates recovered by evaporation of the solvent and thereafter added to the bitumen in desired amounts. In the event that the Al(OH)₃ is reacted directly with the sulfonic acids in the absence of oil, the resulting basic sulfonates may be added directly to the bitumen. In any case, the basic sulfonates may be incorporated in an asphaltic crude oil and distilled to various grades of asphalt base stocks, provided excessively high distillation temperatures are avoided. The basic aluminum sulfonates of this invention are soluble in or compatible with bituminous materials such as petroleum asphalts or residuums, flux asphalts, coal tar pitches or residuums, cracking still tars or residues, as well as heavy naphthenic or aromatic oils, and the like. In accordance with the present invention, the basic aluminum sulfonates may be incorporated in various bituminous materials including asphalt, asphalt cutback, asphalt emulsions, etc., in order to render the bitumen more adhesive or less liable to strip from mineral aggregates. These sulfonates, being relatively heat stable, are particularly adapted for use in hot asphalt or road oil applications.

The present invention may be further illustrated by the following examples, which, however, are not to be construed as limiting the scope thereof. The sulfonic acids employed in the preparation of the basic aluminum sulfonates were obtained by sulfonating a selective solvent extract fraction of a lubricating oil stock having a Saybolt universal viscosity of 524 seconds at 100° F. and an A. P. I. gravity of 17.3°. The lubricating oil stock was treated with 4 successive dumps of 5% by volume each of 105% sulfuric acid, the acid sludge being settled and separated between each dump. The resulting sulfonated oil, when freed of sludge, contained 12% to 13% of free sulfonic acids, such oil having an acid number of 14 to 14.5 mg. KOH per gram. The oil solution of sulfonic acids was reacted with various amounts of freshly precipitated Al(OH)₃ according to the method described hereinbefore, and there were obtained oil solutions of (1) aluminum trisulfonate Al(RSO₃)₃, (2) aluminum monohydroxy sulfonate Al(OH).(RSO₃)₂, (3) aluminum dihydroxy sulfonate Al(OH)₂.(RSO₃), and (4) a mixture of aluminum mono and dihydroxy sulfonates Al(OH).(RSO₃)₂ and $$Al(OH)_2.(RSO_3)$$

in which the mono and dihydroxy compounds each constituted 50% of the mixture.

*Example 1.*—To illustrate the properties of the aluminum sulfonates with respect to adhesion, a road oil was prepared consisting of 66% by weight of 85/100 penetration asphalt and 34% by weight of furnace oil. 5 grams of the road oil were added to 100 grams of 20–60 mesh sand previously wetted with 50 cc. of water. A 12.5% solution of aluminum sulfonate in viscous hydrocarbon oil was added to the road oil-sand mixture in small increments with shaking until adhesion of road oil to sand was observed. This manifested itself by the transfer of the road oil from the water surface to the sand surface, leaving the water phase and container walls substantially free of road oil.

| Additive | Per cent additive based on road oil | Adhesion |
|---|---|---|
| Al(RSO₃)₃ | 0.0 | None. |
| Al(OH).(RSO₃)₂ | 6.8 | Complete. |
| Al(OH)₂.(RSO₃) | 8.0 | Do. |
| Al(OH)₂.(RSO₃) | 6.6 | Do. |
| 50%–50% Mixture of— Al(OH).(RSO₃)₂ Al(OH)₂.(RSO₃) | 6.0 | Do. |

The above values represent the maximum quantities of the additives required since the test was carried out in the presence of a large excess of water at room temperature with no curing.

*Example 2.*—The following data illustrate the effect of size and composition of aggregate on the quantity of aluminum sulfonate necessary for complete adhesion. These tests were carried out at room temperature using the procedure described in Example 1, the additive being a 50%–50% mixture of mono and dihydroxy aluminum sulfonates in oil, as in Example 1.

| Aggregate (wet) | Mesh | Per cent additive based on road oil | Adhesion |
|---|---|---|---|
| Limestone flour | 300+ | 0.0 | None. |
| Limestone | 4 | 0.0 | Do. |
| Sand | 20–60 | 0.0 | Do. |
| Trap rock | 1–3 | 0.0 | Do. |
| Limestone flour | 300+ | 4.8 | Complete. |
| Limestone | 4 | 2.4 | Do. |
| Sand | 20–60 | 4.0 | Do. |
| Trap rock | 1–3 | 2.4 | Do. |
| Do | 3–4 | 2.4 | Do. |
| Do | 4–10 | 3.0 | Do. |

The application of the road oil and adhesion agent at 180° F. in lieu of room temperature reduces the quantity of adhesion agent required by 30% to 45% of the above values.

*Example 3.*—The oil solutions of sulfonates of Example 1, after 15 hours heating at 400° F., were evaluated in the manner described in Example 1, i. e., the oil solution of sulfonate was added to the wet sand in increments until complete adhesion was obtained.

| Additive | Initial Adhesion before heating | Adhesion after 15 hours heating at 400° F. |
|---|---|---|
| | Per cent | Per cent |
| $Al(RSO_3)_3$ | 100 | 12 |
| $Al(OH).(RSO_3)_2$ | 100 | 14 |
| $Al(OH)_2.(RSO_3)$ | 100 | 100 |
| 50%-50% mixture of— | | |
| $Al(OH).(RSO_3)_2$ | 100 | 100 |
| $Al(OH)_2.(RSO_3)$ | | |

From the above examples it will be evident that the addition of small amounts of basic aluminum sulfonates to bituminous substances greatly improves their adhesivity for mineral aggregates, and that the basic sulfonates, particularly the dihydroxy sulfonate and the mixture of mono and dihydroxy sulfonates, being heat stable, are particularly advantageous when used in conjunction with asphalts or road oils which require storage or application at elevated temperatures. In general, the dihydroxy sulfonate and mixtures of mono and dihydroxy sulfonates suffer no diminution of adhesive properties or activity when exposed to temperatures up to 400° F.–500° F. over considerable periods of time, i. e., up to several hundred hours.

We claim:

1. A composition consisting essentially of a major proportion of bitumen and a minor proportion, sufficient to increase the adhesivity of said bitumen for mineral aggregates, of a compound from the class consisting of oil-soluble dihydroxy aluminum petroleum sulfonates and mixtures of oil-soluble mono- and dihydroxy aluminum petroleum sulfonates.

2. A composition consisting essentially of a bitumen and from 0.1% to 10% of a compound from the class consisting of oil-soluble dihydroxy aluminum petroleum sulfonates and mixtures of oil-soluble mono- and dihydroxy aluminum petroleum sulfonates.

3. A composition consisting essentially of a bitumen and from 0.5% to 5% of a compound from the class consisting of oil-soluble dihydroxy aluminum petroleum sulfonates and mixtures of oil-soluble mono- and dihydroxy aluminum petroleum sulfonates.

4. A composition consisting essentially of asphalt and from 0.1% to 10% of a compound from the class consisting of oil-soluble dihydroxy aluminum petroleum sulfonates and mixtures of oil-soluble mono- and dihydroxy aluminum petroleum sulfonates.

5. A composition consisting essentially of asphalt and from 0.5% to 5% of a compound from the class consisting of oil-soluble dihydroxy aluminum petroleum sulfonates and mixtures of oil-soluble mono- and dihydroxy aluminum petroleum sulfonates.

ARTHUR B. HERSBERGER.
FELIX C. GZEMSKI.

REFERENCES CITED

The following references are of record in the file of this patent:

UNITED STATES PATENTS

| Number | Name | Date |
|---|---|---|
| 2,278,954 | Thurston | Apr. 7, 1942 |
| 2,304,230 | Archibald et al. | Dec. 8, 1942 |
| 2,339,853 | Hemmer | Jan. 25, 1944 |
| 2,368,560 | Minich | Jan. 30, 1945 |
| 2,375,055 | Weetman | May 1, 1945 |

FOREIGN PATENTS

| Number | Country | Date |
|---|---|---|
| 510,997 | Great Britain | Aug. 11, 1939 |
| 519,119 | Great Britain | Mar. 18, 1940 |
| 543,625 | Great Britain | Mar. 5, 1942 |

OTHER REFERENCES

Webster's New International Dictionary, 2nd ed., page 277.